United States Patent [19]
Kresse

[11] 3,811,427
[45] May 21, 1974

[54] PRESSURE RECEIVER
[75] Inventor: Heinz Kresse, Erlangen, Germany
[73] Assignee: Siemens A.G., Erlangen, Germany
[22] Filed: Sept. 7, 1972
[21] Appl. No.: 287,125

[30] Foreign Application Priority Data
Sept. 9, 1971 Germany.......................... 2145198

[52] U.S. Cl. ...................... 128/2.05 D, 73/398 R
[51] Int. Cl. ........................ A61b 5/02, G01l 9/02
[58] Field of Search...... 128/2.05 D; 73/398 R, 406, 73/398 AR

[56] References Cited
UNITED STATES PATENTS

| | | | |
|---|---|---|---|
| 3,724,274 | 4/1973 | Millar............................ | 73/398 AR |
| 3,088,323 | 5/1963 | Welkowitz et al. ............... | 73/398 R |
| 3,350,944 | 11/1967 | DeMichele........................ | 73/398 R |
| 3,424,000 | 1/1969 | Chelner et al.............. | 73/398 AR X |
| 3,527,099 | 9/1970 | Herceg......................... | 73/398 AR X |
| 3,553,625 | 1/1971 | Stedman........................ | 128/2.05 X |
| 3,611,797 | 10/1971 | Pugnaire .................... | 73/398 AR X |

FOREIGN PATENTS OR APPLICATIONS

| | | | |
|---|---|---|---|
| 1,262,503 | 3/1968 | Germany ...................... | 128/2.05 D |
| 219,077 | 9/1968 | U.S.S.R........................ | 128/2.05 D |

*Primary Examiner*—Aldrich F. Medbery
*Attorney, Agent, or Firm*—Richards & Geier

[57] ABSTRACT

A pressure receiver for intracorporal pressure measurements, for example, intracardial or intravasal blood pressure measurements, includes a substantially elongated hollow body, preferably a tube, the interior of which is divided by an at least partly elastic separating wall into a first section which is subjected to pressure which is to be measured and a second section having the comparing pressure, whereby changes in the shape of the elastic wall portion are used for measuring the pressure. The invention is particularly characterized in that the separating wall within the hollow body extends between two opposed locations which however, are shifted in the longitudinal direction of the hollow body. According to another construction the separating wall extends tongue-like into the hollow body and consists of two interconnected strips. The hollow space between the two strips being connected with the second section.

4 Claims, 4 Drawing Figures

PATENTED MAY 21 1974   3,811,427

PRESSURE RECEIVER

This invention relates to a pressure receiver for intracorporal pressure measurements, for example, intracardial or intravasal blood pressure measurements, which includes a substantially elongated hollow body, preferably a tube, the interior of which is divided by an at least partly elastic separating wall into a first section which is subjected to pressure which is being measured and a second section having the comparing pressure, whereby changes in the shape of the elastic wall portion are used for measuring the pressure.

A pressure receiver of this type is known from the German Pat. No. 1,262,503.

This pressure receiver consists of a probe closed at its distal end by a diaphragm and a chamber filled with liquid and located within the probe behind the diaphragm. Two platinum electrodes supplied with alternating current as well as a thin-walled tube (of glass) elastically changeable by pressure variations to be measured, project into the chamber and extend in the longitudinal direction of the probe. The tube is closed against the liquid-filled chamber. The tube changes its shape by the action of changes in pressure caused by changes in volume of the liquid-filled chamber produced by movements of the diaphragm. This change in the shape of the tube produces a change in the length of field lines in the liquid of the electrical field extending from the platinum electrodes. These changes which can be considered as changes in resistance or capacity, produce the measure for the appearing variations in pressure.

For intracorporal pressure measurements it is desired to have pressure receivers the diameter of which is smaller than 1 mm. For this reason it is very difficult to manufacture this tube which must be introduced into the pressure receiver along with a pressure variation device. These difficulties are also present when extension measuring strips are glued upon the tube since the application of these strips upon the tube is possible only with special exertion.

An object of the present invention is to improve prior art devices through the provision of a pressure receiver of the described type which can be produced with small technical effort and can be made readily available for general manufacture.

Other objects of the present invention will become apparent in the course of the following specification.

In the accomplishment of the objectives of the present invention it was found desirable to arrange the separating wall within the hollow body so that it extends between two opposed locations which, however, are shifted in the longitudinal direction of the hollow body.

This construction makes it possible in its simplest form to insert the separating wall substantially diagonally into the hollow body and to glue it there. This construction can be varied by dividing the separating wall into two pieces which extend transversely to the longitudinal direction of the hollow body and are fixed therein so that they are shifted in the longitudinal direction. These pieces are tightly connected with each other by an elastic wall portion extending in the longitudinal direction of the hollow body. The two pieces then form end supports for the elastic wall portion. This wall portion as well as the above-described diagonal wall can consist of a semi-conducting extending strip or out of silicon with diffused bridge connection, or the wall portion can consist of an elastic membrane upon which are applied semiconducting extension strips or silicon strips. An elastic glue is used for the tight arrangement of the separating wall portions in the hollow body. This glue makes it possible to bend the separating wall portions, so long as they are elastic, under the action of pressure which is to be measured. Consequently the elastic separating wall portions are somewhat smaller than the actual width of the hollow space at the corresponding location.

Actual experiments have shown that the pressure receivers of the present invention can be manufactured much more easily than the above described prior art pressure receivers. This is caused by the fact that when dimensions are small curved parts are much more difficult to make and to handle than straight or flat structural parts. As a further embodiment of the inventive idea to replace known curved structural parts by flat surfaces, another embodiment of the present invention provides that in a pressure receiver of the above-described type, wherein the separating wall extends tongue-like in the longitudinal direction of the hollow body preferably into the first section, — the tongue should be made of two extensible strips extending parallel to and at a distance from each other and glued at their edges, whereby the extensible strips are made preferably of semiconducting extensible strips or silicon strips with diffusion zones. In this pressure receiver the inner space of the tongue-like separating wall which is connected with the other section, is provided with means preventing the touching of the two tongue-like portions when pressure is exerted upon the tongue. The means preventing the touching consist preferably of an electrically non-conducting distance holder. As in prior art pressure receivers, the pressure receivers of the present invention are so constructed that the first section is closed at the front with a diaphragm free from directing force and is filled with a liquid, preferably silicon oil, while the second section communicates with outside air by means of a catheter hose.

The invention will appear more clearly from the following detailed description when taken in connection with the accompanying drawings showing by way of example only, preferred embodiments of the inventive idea.

Figures 1, 2:
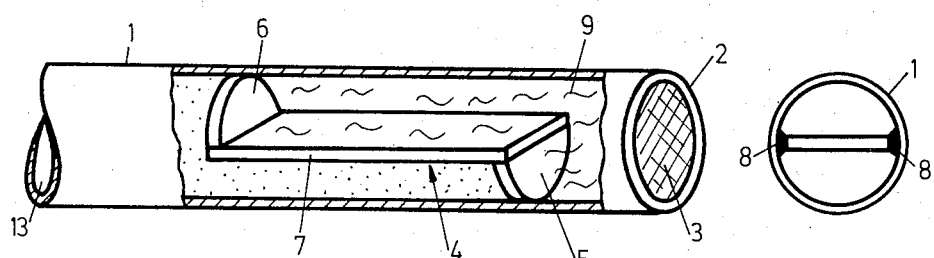
FIG. 1 shows a pressure receiver of the present invention partly in side view and partly in section.
FIG. 2 is a transverse section through the receiver of FIG. 1.

FIG. 1 shows on an enlarged scale a tubular casing 1 of the pressure receiver. The tube 1 is circular in cross-section. At its front side 2 the tube 1 is closed by a diaphragm 3 which is free from directing force. Inside the tube there is the separating wall 4 consisting of the two pieces 5 and 6 and an elastic separating wall part 7 extending in the longitudinal direction of the tube. This wall part 7 has substantially the shape of a rectangular plate the narrow part of which is smaller than the diameter of the tube. The plate is glued to the inner wall of the tube at locations 8. The pieces 5 and 6 are also glued to the wall of the tube as well as to the plate 7. The separating wall 4 in its entirety along with the diaphragm 3 constitutes the first section 9 which is filled with silicon oil. Pressure exerted upon the diaphragm 3 is transmitted by the silicon oil filling to the separating wall and causes the plate 7 to bend between the two semicircular pieces 5 and 6 serving as end supports. If the plate 7 consists of semiconducting extensible strips, or if it consists of a silicon strip with diffused bridge connection, or if the plate carries such strips, then they produce an electric signal when the shape of the plate is changed. This signal can be used as a measure for the pressure to be measured. For this purpose the strips are provided with contacts and are connected by wires to a measuring device. This is not shown in the drawing for the sake of clearer illustration.

Figure 3:
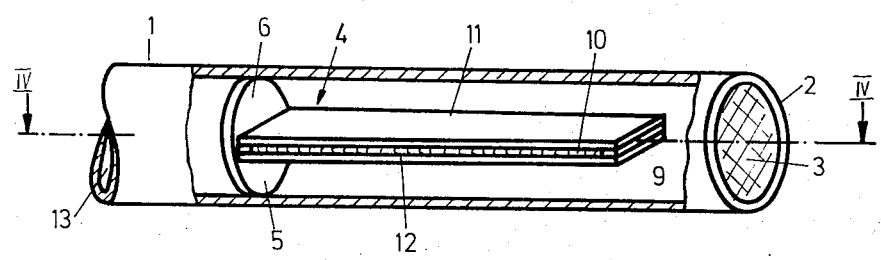
FIG. 3 shows also partly in side view and partly in section another embodiment of the pressure receiver of the present invention.
Figure 4:
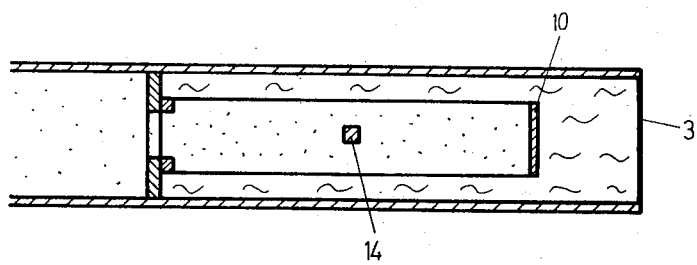
FIG. 4 is a longitudinal section along the line IV — IV of FIG. 3.

In the embodiment shown in FIGS. 3 and 4 the same parts are provided with the same numerals.

According to FIG. 3 the separating wall 4 does not extend within the hollow body between two opposed locations shifted in the longitudinal direction of the hollow body. The surface of the separating wall is considerably increased, as compared to a transverse diaphragm, since it extends tongue-like into the first section 9 substantially in the longitudinal direction of the hollow body. The tongue 4 consists of two parallel stretchable strips 11 and 12 which are glued together at their edges. The edge gluing is indicated by the numerical 10 in FIGS. 3 and 4.

The tongue may also consist of flat plates carrying these strips.

A hollow space is provided between these strips or plates which is in communication with the open end 13 of the tube, which can be described as the second section. The first section 9 is filled with silicon oil. When pressure is exerted through the diaphragm 3 upon the first section 9, the hollow space between the plates 11 and 12 is diminished, so that the plates are bent and provide an electrical signal corresponding to the action of the pressure. In order to prevent the two plates from touching each other, means are provided in the interior of the tongue-like separating wall which prevent the two tongue-like parts from touching each other when pressure is exerted upon the tongue. These means consist of an electrically non-conducting distance holder or spacing means 14.

I claim:

1. A pressure receiver for intracorporal pressure measurements, comprising an elongated hollow body and an at least partly elastic separating wall extending within said hollow body, said separating wall being cantelevered at one end, tongue-shaped and consisting of two spaced semi-conducting parallel extending strips elastically interconnected at their edges, said hollow body having a first section containing said separating wall and a second section being closed from said first section and communicating with the space between said two strips, said first section being filled with a liquid surrounding said wall and receiving the pressure to be transmitted and said second section having a comparing pressure, or vice versa.

2. A pressure receiver according to claim 1, wherein said strips consist of silicon strips with diffusion zones.

3. A pressure receiver according to claim 1, comprising means preventing said two strips from touching each other.

4. A pressure receiver according to claim 3, wherein said means consist of an electrically non-conducting spacer.

* * * * *